(12) United States Patent
Ritter et al.

(10) Patent No.: US 11,719,534 B2
(45) Date of Patent: Aug. 8, 2023

(54) COMPUTERIZED CREATION OF MEASUREMENT PLANS AND PLAN-BASED CONTROL OF MEASUREMENT DEVICES

(71) Applicant: Carl Zeiss Industrielle Messtechnik GmbH, Oberkochen (DE)

(72) Inventors: Markus Ritter, Heidenheim (DE); Kilian Neumaier, Heidenheim (DE); Steffen Hersacher, Westhausen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 174 days.

(21) Appl. No.: 17/193,069

(22) Filed: Mar. 5, 2021

(65) Prior Publication Data

US 2021/0278206 A1 Sep. 9, 2021

(30) Foreign Application Priority Data

Mar. 5, 2020 (EP) ..................................... 20161279

(51) Int. Cl.
*G01B 21/20* (2006.01)
*G01Q 30/04* (2010.01)

(52) U.S. Cl.
CPC ............. *G01B 21/20* (2013.01); *G01Q 30/04* (2013.01)

(58) Field of Classification Search
CPC ....... G01B 21/20; G01B 21/047; G01Q 30/04
See application file for complete search history.

(56) References Cited

U.S. PATENT DOCUMENTS

2001/0049589 A1* 12/2001 Yasuda ................. G03F 9/7003
702/152
2010/0073687 A1* 3/2010 Spalding ............ G01B 11/2425
356/625
(Continued)

FOREIGN PATENT DOCUMENTS

DE 102008049567 A1 4/2010
DE 102018209570 A1 * 12/2018
(Continued)

OTHER PUBLICATIONS

Carl Zeiss Industrielle Messtechnik GmbH brochure, "CALYPSO, einfach programmieren" (publication No. 60-11-068).
(Continued)

*Primary Examiner* — Eman A Alkafawi
(74) *Attorney, Agent, or Firm* — Miller Johnson

(57) ABSTRACT

A method creates a measurement plan of a dimensional measuring apparatus or controls a measurement of the dimensional measuring apparatus. The method includes receiving setting parameters defining a measurement or control command of multiple measurement or control commands of the dimensional measuring apparatus. The method includes evaluating the setting parameters based on at least one of a statistical evaluation and an evaluation using machine-assisted learning. The method includes determining a presetting that assigns at least one setting parameter of the evaluated setting parameters to the measurement or control command. The method includes outputting a setting parameter proposal based on the determined presetting in response to receiving an input command for selecting the measurement or control command.

20 Claims, 4 Drawing Sheets

(56) References Cited

U.S. PATENT DOCUMENTS

2012/0246953 A1* 10/2012 Engel .................. G01B 21/045
                                                      33/502
2016/0261791 A1   9/2016 Satoyoshi
2017/0241759 A1*  8/2017 Werner .................... G01B 5/20
2020/0324482 A1* 10/2020 Taig ........................ G06T 17/00

FOREIGN PATENT DOCUMENTS

EP    2881704 A1   6/2015
FR    2860900 A1   4/2005

OTHER PUBLICATIONS

Carl Zeiss brochure "Einfach Messung und was Sie dazu wissen sollten—Eine Fibel der Messtechnik" (purchase order No. Carl Zeiss: 61212-2400101).

* cited by examiner

COMPUTERIZED CREATION OF MEASUREMENT PLANS AND PLAN-BASED CONTROL OF MEASUREMENT DEVICES

CROSS-REFERENCE TO RELATED APPLICATIONS

This application claims priority to European Application No. 20 161 279.3, filed on Mar. 5, 2020. The entire disclosure of the application referenced above is incorporated by reference.

FIELD

The present disclosure relates to industrial metrology and more particularly to computerized creation and execution of measurement plans for measurement devices.

BACKGROUND

This disclosure relates to a method and a device for assisting a user in creating a measurement plan for a measurement to be carried out with a measuring apparatus and/or in controlling the measurement to be carried out with the measuring apparatus. Furthermore, the disclosure relates to a computer program product with the aid of which the method is able to be carried out on a computer. Both the measurement planning and the control are usually effected in a software-based manner in practice.

Dimensional measuring apparatuses for which such software-based planning and control of the measurement sequence is used are coordinate measuring machines or microscopes, for example. Roughness measuring apparatuses or other measuring apparatuses for measuring distances and/or surface properties of an object are likewise understood as dimensional measuring apparatuses in the present sense.

Coordinate measuring machines having tactile and/or optical measuring sensors are used in dimensional metrology in order to ascertain the shape of a workpiece surface by scanning, for example. Since dimensional metrology generally finds application in branches of industry in which very high accuracies are required, for example for sub-sequent processing steps or for quality assurance, error-free implementation of measurements is of immense importance.

Microscopes—e.g., scanning electron microscopes (SEMs) or atomic force microscopes (AFMs)—are used to view or to represent as an image for example the surface of a workpiece in the course of quality control under high magnification. The surfaces observed have for example structures whose order of magnitude is below the resolving power of a human eye, in some instances at the atomic level. Microscopic measuring apparatuses are preferably used in the fields of biotechnology, medicine and materials sciences.

In order to ensure a reproducible, error-free measurement sequence by means of these measuring apparatuses, as detailed planning and control of the measurement sequence as possible is necessary. When creating a measurement plan, which is also referred to as a test plan, a user defines a plurality of measurement paths at and around an object to be measured, e.g. by means of a software application. For each measurement path, the user additionally creates various measurement parameters and machine-related control parameters in the form of setting parameters. These setting parameters can be e.g. a number of measurement points to be moved to on a measurement element, a measurement direction to be defined and/or a measurement speed.

One software application which makes it possible to create measurement plans, to control the measuring apparatuses and to process the measurement results obtained is offered under the designation CALYPSO by Carl Zeiss Industrielle Messtechnik GmbH, for example. The principles of CALYPSO are described for example in a brochure entitled "Einfache Messung and was Sie dazu wissen sollten—Eine Fibel der Messtechnik" ["Simple measurement and what you should know about it—a metrology primer"] (Order number from Carl Zeiss: 61212-2400101) or in an advertising brochure from Carl Zeiss Industrielle Messtechnik GmbH entitled "CALYPSO. Einfach programmieren" ["CALYPSO. Simple programming"] (publication number 60-11-068).

The measurement sequence is created by CALYPSO software on the basis of so-called test features. Test features represent dimensional properties of one or more geometric elements (so-called measurement elements) on a measurement object.

Example measurement elements are drilled holes in the measurement object, a cylinder section on the measurement object, an edge of the measurement object, an outer or inner surface of the measurement object or a characteristic point on the surface of the measurement object, etc.

Example test features are: A spatial distance between two points, a spatial distance between two straight lines/edges, a spatial distance between two planes, a spatial distance between a point and a straight line or a plane, a spatial distance between a straight line and a plane, a spatial distance between a plane, a straight line or a point and an origin of a coordinate system, a projection of a spatial distance onto a coordinate axis, a spatial angle, a projection of a spatial angle into a coordinate plane, a parallelism of two straight lines or planes, a perpendicularity of two straight lines or planes, a shape deviation of a circle, of a circle segment, of a straight line, of a rectangle, of an elongated hole or of a plane, a diameter or a radius of a circle or of a circle segment, a curve length, a curve shape, a circularity of a circle or of a circle segment, a straightness of a straight line, a planarity of a plane and/or a roughness of a surface.

In order to quantify a test feature of a measurement element, generally a plurality of measurement points on each measurement element have to be moved to with the measuring head and detected thereby.

In order to create the measurement sequence, the user typically firstly defines the measurement elements to be measured on the measurement object. In this case, the user defines in the software, on the basis of a CAD model of the measurement object, for example, what geometric elements (measurement elements) of the measurement object are intended to be measured. By way of example, the user establishes a cylinder as measurement element by menu selection. For each measurement element, the user then defines the geometric properties of the measurement element (e.g. radius, height, width, etc.) on the basis of setting parameters, usually manually.

Afterward, the user employs a cursor to choose the individual measurement elements established, for example, and selects them by clicking or double clicking using a mouse. In this setting menu, the user selects one or more setting parameters (e.g. a number of measurement points and/or a measurement speed) from a plurality of measurement-element-related setting parameters and defines a concrete parameter value for each setting parameter selected.

Besides creating the measurement plan, the user additionally defines a plurality of control-related parameters, likewise in the form of setting parameters (for example for light and machine control). In this regard, for example in the context of machine control, the user establishes on the measurement object one or more reflected light circles with specific edge finding parameters in each case, in order to ensure error-free edge finding on the measurement object particularly in the case of coordinate measuring machines that operate optically.

A high time expenditure arises for the user on account of the high complexity and plurality of selection possibilities when selecting setting parameters during the various measurement planning and control phases. This high time expenditure coupled with ex-pert knowledge required for the measurement planning and control results in a high cost factor that needs to be reduced from an economic standpoint.

One step that is already available nowadays in the direction of temporally optimizing the planning of measurement and control sequences for a measuring apparatus consists in one or more pre-settings for one or more setting parameters being made available to the user by software, depending on the current purpose of application. One possibility for defining these application-related pre-settings consists in the most frequently occurring presetting being defined for each setting parameter manually and depending on the respective purpose of application.

What is disadvantageous here is that a large number of possible and simultaneously frequent, potential pre-settings is available in some cases or this number is comparatively limited in other cases. Consequently, a presetting which is meaningful for the user cannot be chosen manually for every purpose of application. Moreover, manually defining pre-settings is in turn associated with an, albeit only initial, time expenditure for setting.

An alternative possibility vis a vis the manual definition of pre-settings consists for example in adhering to the setting parameters last selected by the user within a specific time interval, and their associated parameter values, as pre-settings, whereby at least the time expenditure for defining the pre-settings is omitted.

However, this alternative also has a disadvantage. If, in a special case, for example, the user defines setting parameters and parameter values applicable specifically to this special case, these specific setting parameters are stored as pre-settings by software, as a result of which otherwise frequent setting parameters and parameter values chosen by the user are overwritten and are no longer available for later selection.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is an object to provide a method and a device for assisting a user in creating a measurement plan for a measurement to be carried out with a measuring apparatus and/or in controlling the measurement to be carried out with the measuring apparatus in such a way that a time expenditure for creating a measurement plan and/or for control is reduced and creation is facilitated for the user.

According to an aspect, a method for assisting a user in creating a measurement plan for a measurement to be carried out with a measuring apparatus and/or in controlling the measurement to be carried out with the measuring apparatus is provided, wherein the method comprises the following steps:

receiving a plurality of setting parameters which are selected by a user with regard to one measurement or control command from a plurality of measurement or control commands for the measurement to be carried out with the measuring apparatus (100);

evaluating the plurality of setting parameters on the basis of a statistical evaluation and/or an evaluation by means of machine-assisted learning;

determining a presetting which assigns at least one setting parameter of the evaluated plurality of setting parameters to the measurement or control command; and outputting a setting parameter proposal on the basis of the determined presetting if an input command for selecting the measurement or control command is received.

According to a further aspect, a device for assisting a user in creating a measurement plan for a measurement to be carried out with a measuring apparatus and/or in controlling the measurement to be carried out with the measuring apparatus is provided, wherein the device comprises a display and an evaluation and control unit, wherein the evaluation and control unit is connected to the display via a data connection and is configured:

to receive a plurality of setting parameters which are selected by a user with regard to one measurement or control command from a plurality of measurement or control commands for the measurement to be carried out with the measuring apparatus;

to evaluate the plurality of setting parameters on the basis of a statistical evaluation and/or an evaluation by means of machine-assisted learning;

to determine a presetting which assigns at least one setting parameter of the evaluated plurality of setting parameters to the measurement or control command; and to output a setting parameter proposal on the basis of the determined presetting if an input command for selecting the measurement or control command is received.

In accordance with a further aspect, a computer program product is provided comprising program code configured to carry out the method mentioned above when the program code is executed on a computer.

An advantage of the presented method and device is that pre-settings no longer have to be defined manually by the user or are no longer restricted to settings last effected by the user. Consequently, the pre-settings are no longer restricted to a previously defined set of pre-settings, but rather arise, preferably user-specifically, in the course of (ongoing) application of the method or during the use of the device by the user.

A further advantage is that determining a presetting in the abovementioned manner makes it possible to determine user-related pre-settings which are adapted to the user's preferences or application habits and preferably continue to adapt thereto during ongoing application of the method.

In other words, by means of the presented method and device, all relevant user interactions during the creation of a measurement plan and/or the control of a measuring apparatus are detected, determined and evaluated, such that it is possible to output a setting parameter proposal.

Whenever a (specific) measurement or control command is selected, the user would actually have to select a plurality of setting parameters, which is now simplified with the aid of the method by determining a specific presetting with regard to each measurement or control command. Moreover, upon each (renewed) selection of a measurement or control command, the available amount of data for the statistical evaluation and/or the evaluation by means of artificial intelligence is increased, as a result of which the determination of the respective presetting always becomes more exact.

In particular, it is advantageous if the evaluation of the plurality of setting parameters is effected on the basis of machine-assisted learning or by means of artificial intelligence, since in such a case, compared with a purely statistical evaluation, the user is spared the creation of complex evaluation rules. The completely free creation of sets of rules or pre-settings, e.g. by means of machine learning, is therefore not absolutely necessary, but advantageous since the creation of complex rules by the user or the developer can be obviated.

The pre-settings with regard to the measurement and control commands of the current user interaction, which pre-settings are determined by means of the method, are not automatically adopted as setting parameters, but rather are output or displayed to the user as a setting parameter proposal, which the user can actively accept (for example pressing an OK button) or reject (for example pressing a cancel button). The settings which arise from the application of the set of rules or the pre-settings in the ongoing context of the current user interaction are therefore not automatically applied, but rather displayed to the user as a proposal. The user can himself/herself decide whether this proposal ought to be applied or adopted.

Therefore, preferably from any type of user interaction which can always be assigned to a specific context, the method can deduce what the user, on the basis of the user interaction effected in each case, would be expected to want to do in the next step, and outputs for this prediction a corresponding setting parameter proposal, which can spare the user an input in terms of software if the proposal is accepted. The system thus learns preferably automatically (e.g. by means of reinforcement learning) from context-sensitive user interactions what kind of setting, view and/or input preferences the user has (or approximates which preferences the user might have), and determines on this basis a, preferably user- and context-specific, setting parameter proposal.

Receiving the plurality of setting parameters can be effected either by way of detecting all user interactions which the user effects by means of mouse clicking or keyboard, for example, or else by loading a data set stored in a memory. In other words, receiving the plurality of setting parameters can be effected both in the course of ongoing application of the method and in advance or retrospectively by means of a stored data set.

In addition to the setting parameter proposal to be output, the user can furthermore carry out, if desired, manual pre-settings (for example if a visibility of individual user interfaces (UIs) is intended to be set). However, there is no necessity for manual pre-setting. In the present case, the term "plurality" is understood to mean two or more.

In the present case, the term "measurement or control command" is understood to mean any type of user interaction which is effected within a certain context when creating a measurement plan and/or for controlling a measuring apparatus. In other words, the term "measurement or control command" can be understood to mean for example an input last effected by the user (for example establishing a measurement element, defining a size of a measurement element, establishing a number of measurement points on a measurement element, etc.). With respect to each context or measurement or control command, a plurality of setting parameters are available to the user.

A measurement command can thus be understood to mean for example the selection of a menu item within a measurement plan application (e.g. menu item "establishing measurement elements") or the selection of a submenu item (e.g. menu item "establishing a cylinder as measurement element").

In the present case, the term "setting parameter" is understood to mean any possible setting function with regard to a measurement or control command which is available in the measurement plan and control application and/or at the measuring apparatus in terms of hardware.

The number of setting parameters available with respect to a specific measurement or control command varies depending on the measurement or control command. However, in order to ensure a "meaningful" statistical evaluation and/or evaluation by means of artificial intelligence, it is advantageous if at least two setting parameters are received which were selected by the user with regard to one (specific) measurement or control command from the plurality of measurement or control commands. As a rule, however, a plurality of setting parameters (e.g. >5 setting parameters per measurement or control command) are selected by the user when creating a measurement plan.

It should additionally be mentioned that evaluation by means of machine-assisted learning comprises any evaluation methods which are known in connection with artificial intelligence or a neural network, wherein semi-supervised learning, reinforcement learning, active learning or self-training may be mentioned by way of example. Unsupervised machine-assisted learning is likewise possible as well.

All relevant user interactions with the overall system are thus recorded, the recorded interactions then being analyzed or evaluated statistically and/or by machine-assisted learning. For a defined quantity of setting possibilities, the settings chosen by the user are thus either evaluated statistically and the most frequently chosen setting in each case is determined as the presetting. Alternatively or supplementary, for a defined quantity of setting possibilities, the settings chosen by the user, including their context in which they were chosen, can be evaluated by an intelligent system, e.g. a neural network. For each of the setting possibilities determined, the most probable presetting is chosen for each unique context recognized. Therefore, all settings chosen by the user, including the context in which they were chosen, are evaluated by the intelligent system. The system then determines a set of rules comprising respectively a setting possibility including its relevant context and the most probable presetting.

In a refinement, the plurality of setting parameters comprise in each case parameter values and/or information with regard to the measurement or control command.

The term "parameter values" is understood to mean, in particular, numerical parameter values or the values defined by the user with respect to a specific setting parameter (for example a radius, a height, a length, a width of a measurement element). Moreover, the term "parameter values" can for example also be understood to mean a word input effected by the user as setting parameter (for example measurement direction "counterclockwise").

In the present case, the wording "information with regard to the measurement or control command" is understood to mean that, by means of the method, preferably not only concrete setting parameter values (in the form of numerical values), such as e.g. a number of measurement points or a measurement or search direction, but preferably also background information or metadata, such as, for example, a visibility of a user interface element or an image excerpt to be selected from a 3D scene, with regard to each measurement or control command can be received and evaluated in order to determine a respective user-specific presetting. In addition, it is also possible to receive information in terms of hardware with regard to each measurement or control command. The settings which are evaluated or learned (e.g. by machine learning) thus comprise not only concrete parameter values, but also further information.

In a refinement, the statistical evaluation comprises determining a frequency distribution in which a frequency value is assigned to each of the received plurality of setting parameters.

The frequency distribution is preferably created using mathematically known methods of descriptive statistics optionally in combination with text-based evaluation methods, wherein preferably both numerically based and text-based setting parameters are evaluated. The frequency distribution, for example in the form of a Gaussian bell curve, is preferably normalized to the plurality of setting parameters.

In a refinement, determining the presetting comprises assigning the at least one setting parameter of the plurality of setting parameters to the measurement or control command depending on the frequency distribution.

In other words, for the plurality of setting parameters or for the quantity of setting possibilities, in each case the plurality of setting parameters chosen by the user are evaluated statistically in such a way that in each case the most frequently chosen setting parameters are determined as presetting and output as setting parameter proposal to the user during the (renewed) selection of the respective measurement or control command. It should be mentioned that for example a plurality of setting parameters which e.g. exceed a certain frequency value can also be determined as presetting with respect to a respective measurement or control command.

In a refinement, the evaluation by means of machine-assisted learning comprises determining a probability distribution in which a probability value is assigned to each of the received plurality of setting parameters.

The machine-assisted learning, for example implemented as a neural network, preferably on the basis of a historical consideration of the plurality of setting parameters selected by a user with respect to a respective measurement or control command, can determine a probability value for each individual one of these setting parameters. Said probability value preferably indicates how probable it will be that the user will again select a specific setting parameter with regard to a specific measurement or control command during a future selection of the specific measurement or control command.

In a refinement, determining the presetting comprises assigning the at least one setting parameter of the plurality of setting parameters to the measurement or control command depending on the probability distribution.

In other words, preferably, that setting parameter which has the highest probability value is chosen or those setting parameters which exceed e.g. a predetermined probability value are chosen. Consequently, for the plurality of setting parameters for each recognized, unique context or measurement or control command, the most probable setting parameter can be determined as presetting.

In this way, the plurality of setting parameters chosen by the user, including their reference to a respective measurement or control command under which they were chosen, are evaluated, such that as it were a set of setting parameter proposals is determined by the advantageous method. As a result, in each case at least one setting parameter can be determined as presetting with respect to each of the plurality of measurement or control commands.

In a refinement, the probability values are determined on the basis of a predetermined training data set.

This refinement serves in particular to clarify that the plurality of setting parameters can be evaluated by means of machine-assisted learning, preferably using artificial intelligence, not only in the course of the ongoing method, but also by means of a training data set provided, as it were for the calibration of the method. Instead of a set of rules, a model that covers all arbitrary or possible situations (e.g. user interactions) can thus also be trained by machine learning.

The training data set can be for example a labelled data set (evaluated beforehand by an expert) or an unlabeled data set (for example on the basis of the data history).

In a further refinement, the steps of receiving, evaluating, determining and outputting are carried out continuously, recurrently.

That is to say, in other words, that the method is preferably carried out in a constantly repeating manner. Consequently, upon (renewed) reception of an input command which results in the user selecting one measurement or control command from the plurality of measurement or control commands, the setting parameter proposal received with this and optionally even further setting parameters defined by the user can serve as input variable for the step of (renewed) reception of the plurality of setting parameters. There is thus feedback from the step of outputting to the step of receiving. The data generated during outputting thus serve as input data for the step of receiving, such that the data from which the respective presetting is determined are continuously updated and the data set to be evaluated is extended. The recording, analysis and extension of the rule data set and respectively the updating of the pre-settings are thus continued continuously. In this regard, therefore, for the application of the rule data set and respectively the pre-settings, the context of the current user interaction is constantly determined and the setting that appropriately matches that is chosen.

Preferably, the method always proceeds in the background and in the process records all user-effected actions and/or inputs in the form of measurement or control commands and associated setting parameters in order to evaluate them continuously statistically and/or by means of machine-assisted learning.

In a further refinement, the steps of receiving, evaluating, determining and outputting are carried out only if the user activates a predefined assistance mode.

This refinement clarifies that the method need not necessarily be carried out continuously, rather it is also possible, for example, for the user to activate a specific mode in which the method is carried out, or for the user to enable the analysis and extension to be carried out independently of the use of the actual software package in an external component. The recording, analysis and extension of the rule data set and respectively the updating of the pre-settings therefore do not have to be continued continuously. In this case, the pre-settings being determined for the respective measurement or control commands are not updated continuously, rather such updating or determination of (more up to date) pre-settings is effected only in a mode intended therefor. In addition, this clarifies that the method does not necessarily require an active input of measurement or control commands and setting parameters, rather pre-settings can also be determined on the basis of an external data set.

In a further refinement, the method furthermore comprises the following steps: Receiving a further input command for selecting a hitherto unknown measurement or control command which is selected for the first time; comparing the hitherto unknown measurement or control command with the plurality of measurement or control commands; determining a similar measurement or control command from the plurality of measurement or control commands, which is similar to the hitherto unknown measurement or control command, on the basis of the comparison; and outputting the setting parameter proposal with respect to the similar measurement or control command.

In this refinement, the user selects for example a hitherto unknown or not yet selected measurement or control command for the first time in the context of the method and would like to define with respect to it for example a plurality of setting parameters for which a presetting or a setting parameter proposal is not yet available in the method.

In this case, the measurement or control command selected for the first time is preferably compared with the already selected plurality of measurement or control commands. On the basis of this comparison, it is then possible to determine, optionally and if present, a measurement or control command from the plurality of measurement or control commands which is similar to the hitherto unknown measurement or control command and for which a presetting has already been determined. It is thus possible to provide the user with a setting parameter proposal even for a hitherto unknown measurement or control command.

In a further refinement, the method furthermore comprises the following steps: Receiving a further input command for selecting a hitherto unknown measurement or control command which is selected for the first time; comparing the hitherto unknown measurement or control command with the plurality of measurement or control commands; determining at least two similar measurement or control commands from the plurality of measurement or control commands, which are similar to the hitherto unknown measurement or control command, on the basis of the comparison; interpolating between the pre-settings assigned to the at least two similar measurement or control commands; and outputting an interpolated setting parameter proposal.

In this refinement, it is possible to determine with respect to a hitherto unknown measurement or control command at least two measurement or control commands which are similar to the hitherto unknown measurement or control command. With respect to the two similar measurement or control commands, the method has already determined in each case a presetting which has assigned at least one setting parameter of the plurality of setting parameters to the respective measurement or control command. It is then possible to interpolate between these already known pre-settings in order thus to output an interpolated setting parameter proposal for the hitherto unknown measurement or control command, with the result that the user obtains a presetting even for said hitherto unknown measurement or control command. Thus, if none of the rules determined hitherto as pre-settings is exactly applicable to the current context or measurement or control command, it is also possible to interpolate between the closest rules.

By means of the interpolation between already known pre-settings, a meaningful presetting can thus be determined even for situations for which no explicit presetting has been defined.

In a further refinement, the device together with further hardware and/or software components is comprised in a measuring apparatus or overall system, is arranged thereat or is integrated therein.

In this refinement, it is also possible to detect interactions of the user with one of these components in the form of measurement or control commands, with the result that for these further hardware and/or software components, too, either component-specific pre-settings and/or cross-component pre-settings, for example for the overall system, can be determined.

In a further refinement, it is additionally advantageous that the pre-settings determined by the presented method or respectively the presented device can be edited, corrected and/or deleted by the user.

It goes without saying that the features mentioned above and those yet to be explained below can be used not only in the combination that is respectively indicated, but also in other combinations or by themselves, without departing from the spirit and scope of the present disclosure.

Moreover, it goes without saying that the features mentioned above and those yet to be explained below relate not only to the herein presented method but also equivalently to the presented device and to the presented computer program product.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
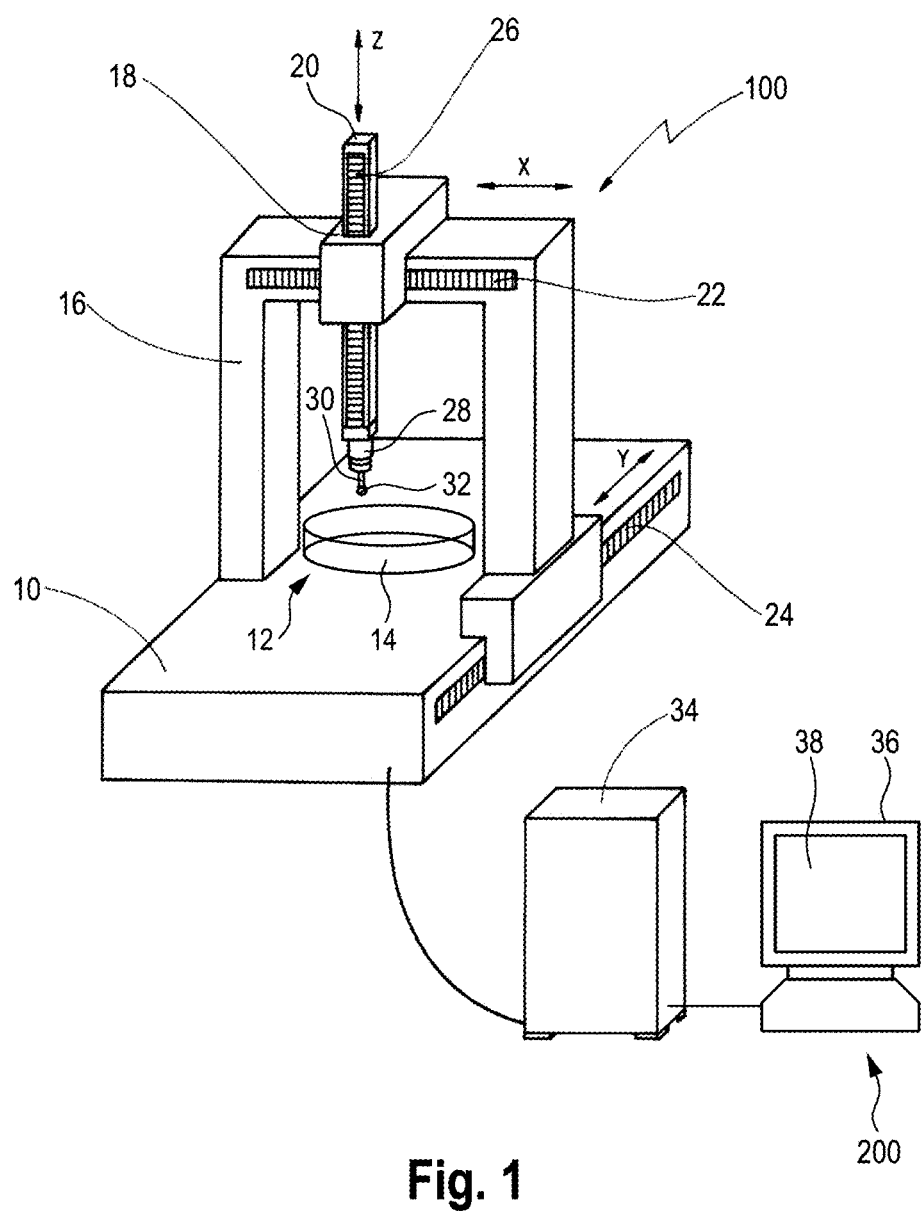
FIG. 1 shows a measuring apparatus with an example embodiment of the device.

FIG. 1 shows an example measuring apparatus with an example embodiment of a device according to the disclosure, on which the herein presented method is able to be carried out. The measuring apparatus is designated in its entirety by the reference numeral 100. The device is identified in its entirety by the reference numeral 200.

In the present example, the measuring apparatus 100 is a coordinate measuring machine of so-called gantry design. In other example embodiments, the measuring apparatus 100 can also be a microscope, for example a scanning electron microscope or an atomic force microscope. The measuring apparatus 100 can also be other types of coordinate measuring machines or in principle other types of measuring apparatuses for dimensional measurement.

The coordinate measuring machine 100 shown in FIG. 1 comprises a base 10. The base 10 is preferably a stable plate, which is produced from granite, for example. A workpiece receptacle 12 designed to hold a measurement object 14 is arranged on the base 10.

A gantry 16 is arranged on the base 10 such that it is displaceable in the longitudinal direction. The gantry 16 serves as a movable carrier structure. The gantry 16 has two columns projecting upward from the base 10, which are connected to one another by a crossbeam and have an inverted U-shape overall.

The direction of movement of the gantry 16 relative to the base 10 is usually referred to as the Y-direction. A slide 18, which is displaceable in the transverse direction, is arranged on the upper crossbeam of the gantry 16. This transverse direction is usually referred to as the X-direction. The slide 18 carries a sleeve 20, which is movable in the Z-direction, that is to say perpendicularly to the base 10.

Measuring devices on the basis of which the X-, Y- and Z-positions of the gantry 16, the slide 18 and the sleeve 20 can be determined are denoted by the reference signs 22, 24, 26. The measuring devices 22, 24, 26 are typically glass rulers, which serve as measuring scales. These measuring scales are designed in conjunction with corresponding reading heads (not shown here) to determine the respectively current position of the gantry 16 in relation to the base 10, the position of the slide 18 in relation to the upper crossbeam of the gantry 16 and the position of the sleeve 20 in relation to the slide 18.

A measuring head 28 is arranged at a lower, free end of the sleeve 20. The measuring head 28 is configured to detect measurement points on the measurement object 14. The measuring head 28 is part of a measuring sensor, the measuring sensor system of which can be arranged separately from the measuring head 28 or can be integrated in the latter and can be connected thereto by way of one or more cables or in wireless fashion. The measuring head 28 has a tactile stylus 30, which projects in the Z-direction in the direction of the base. The stylus 30 is configured to scan a surface of the measurement object 14 by means of a probe head 32. By way of example, the probe head 32 is a ruby sphere.

When scanning the surface of the measurement object 14, the probe head 32, in the measuring head 28, generates an electrical measurement signal, on the basis of which it is possible to ascertain the dimensional properties of the measurement object 14 to be measured. In order to move to the measurement points on the measurement object 14, the measuring head 28 is moved relative to the workpiece receptacle 12 or to the measurement object 14. For this purpose, the movements of the gantry 16 relative to the base 10, of the slide 18 relative to the gantry 16 and of the sleeve 20 relative to the slide 18 are controlled by an evaluation and control unit 34 by means of a plurality of predefined control commands for example by way of CNC driving.

In FIG. 1 the evaluation and control unit 34 is arranged as a separate unit at a distance from the coordinate measuring machine 100 and is connected to the base 10 of the coordinate measuring machine via a plurality of cables. The evaluation and control unit 34 should furthermore also be regarded as part of the device 200. The device 200 serves not only for controlling the coordinate measuring machine 100 but also, in advance of the measurement, for assisting a user in creating a measurement plan for a measurement to be carried out with the coordinate measuring machine 100 and/or during the measurement in the course of control of the measurement to be carried out with the coordinate measuring machine 100.

Before such a measurement begins, the measurement sequence is typically defined in a measurement plan. This comprises defining, in particular, what geometric elements (measurement elements) of the measurement object 14 are intended to be measured and what dimensional measurement variables (test features) of said measurement elements are intended to be detected quantitatively by the coordinate measuring machine 100. Furthermore, diverse parameters concerning the measurement strategy, measurement speed and concerning the control of the coordinate measuring machine 100 and in particular of the measuring head 28 are defined in the measurement plan.

The device 200 is configured as a computer 36 in the present case. Said computer 36 comprises a display 38 besides the evaluation and control unit 34, which is typically configured as a computing unit of the computer. The evaluation and control unit 34 preferably comprises a processor and a storage device (e.g. a hard disk). Program code of a software application that is executable with the aid of the processor of the evaluation and control unit 34 is stored in said storage device. In the present case, the evaluation and control unit 34 is arranged outside the computer 36, but can also be integrated therein.

One example software application is the CALYPSO software sold by the applicant. CALYPSO is software for planning measurement paths and for evaluating measurement points that is preferably designed to carry out the method.

Figure 2:
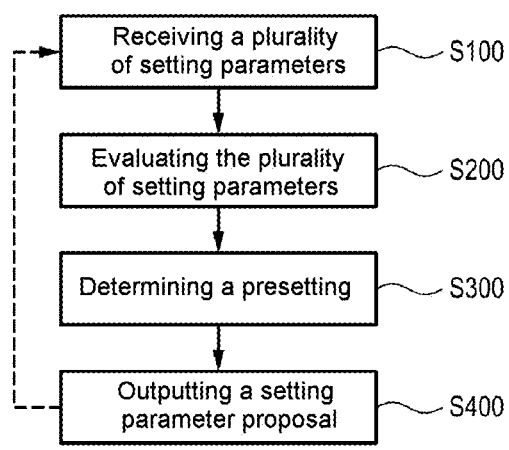
FIG. 2 shows a flow diagram of an example embodiment of the method.

FIG. 2 shows an embodiment of the presented method as a flow diagram. In order to afford a better understanding, the method is illustrated on the basis of an example measurement command selected by a user in FIGS. 3-5. For further illustration, the method is illustrated on the basis of an example control command selected by a user in FIGS. 6 and 7. The reference signs introduced with regard to FIG. 2 can be gathered in each case from FIGS. 3-7.

A step S100 comprises receiving a plurality of setting parameters 42 which are selected by a user with regard to one measurement or control command 40 from a plurality of measurement or control commands for the measurement to be carried out with the coordinate measuring machine 100.

Step S200 comprises evaluating the plurality of setting parameters 42 on the basis of a statistical evaluation and/or an evaluation by means of machine-assisted learning.

Preferably, e.g. the evaluation and control unit 34 is configured to evaluate the plurality of setting parameters 42 in a statistical manner and/or has artificial intelligence, for example in the form of a neural network, which enables an evaluation on the basis of machine-assisted learning. The individual computation processes in the evaluation of the plurality of setting parameters 42 are preferably carried out by means of a powerful processor incorporated in the evaluation and control unit 34.

A step S300 comprises determining a presetting 46 which assigns at least one setting parameter 48 of the evaluated plurality of setting parameters 42 to the measurement or control command 40.

A step S400 comprises outputting to a user a setting parameter proposal 50 on the basis of the determined presetting 46 if an input command for selecting the measurement or control command 40 is received (anew) i.e. is input into the CALYPSO software e.g. by way of a user input.

In the present case, the setting parameter proposal 50 determined and optionally also even further setting parameters selected by the user with regard to the measurement or control command 40 serve again as input for step S100, since the method in accordance with the example embodiment in FIG. 2 is carried out continuously (in the form of a continuous loop).

Figure 3:
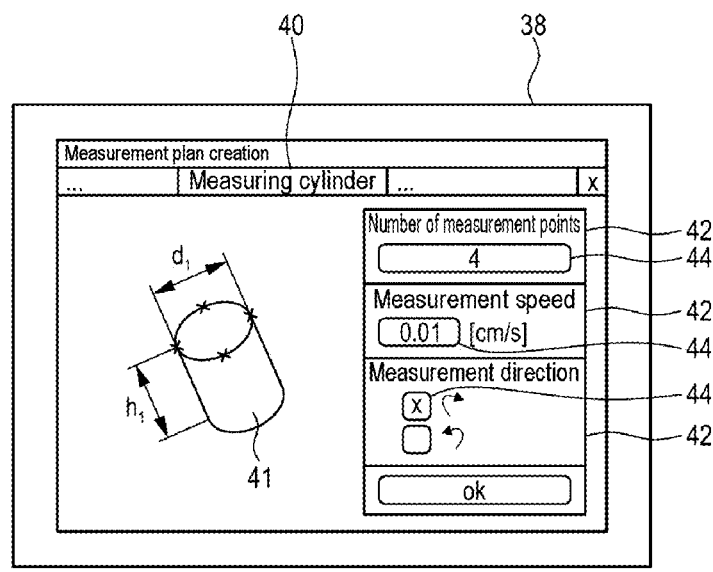
FIG. 3 shows a first schematic illustration for elucidating principles of the method.
Figure 4:
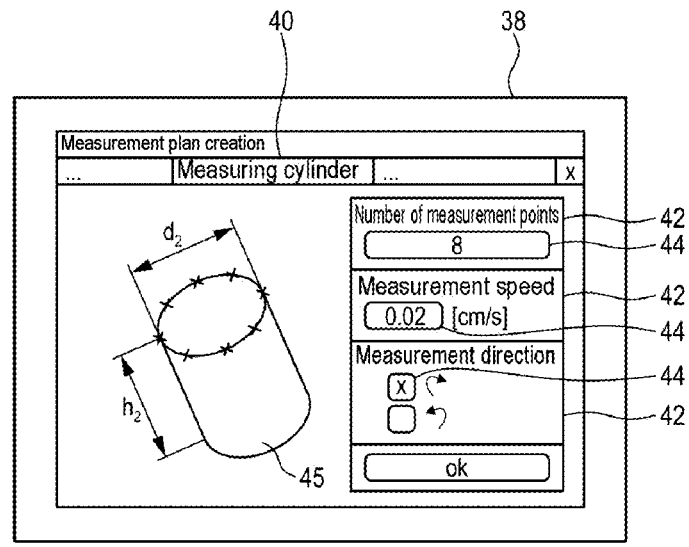
FIG. 4 shows a second schematic illustration for elucidating principles of the method.
Figure 5:
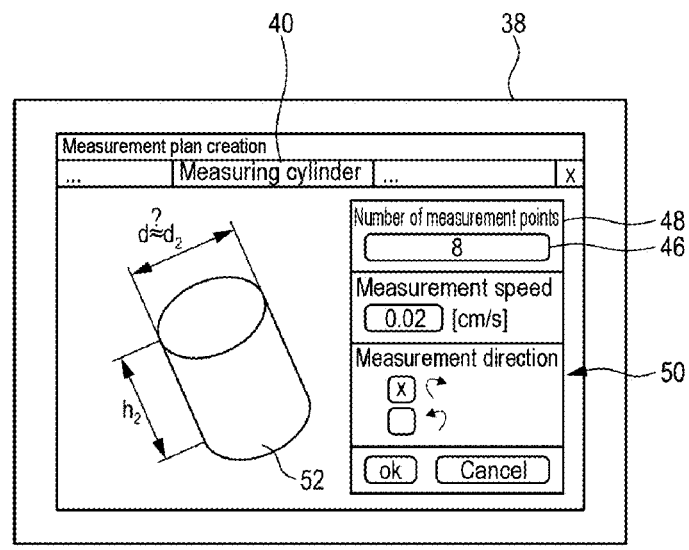
FIG. 5 shows a third schematic illustration for elucidating principles of the method.

FIGS. 3-5 illustrate three mutually different, schematic display views as seen by a user of the CALYPSO software for example on the display 38 when creating a measurement plan. In order to afford a better understanding, FIG. 3 firstly explains the selection of the measurement command 40 from a plurality of measurement commands and the selection of the associated plurality of setting parameters serving e.g. as an input variable for step S100.

Through navigation by means of mouse and/or keyboard, the user arrives for example first at the menu "Measurement plan creation" and then at the submenu "Measuring cylinder", which is available to the user for selection as one of a plurality of submenus in the menu "Measurement plan creation". In principle, these interactions of the user can already be understood as measurement commands.

In the present case, the user generates an input command for selecting the measurement command 40, e.g. by using a mouse to click or double click on the field "Measuring cylinder". As a result, an input mask opens (see FIG. 3, on the right), which here assists the user to effect settings in order to measure a cylinder 41. The cylinder 41 thus constitutes the measurement element to be measured. The measurement command 40 "Measuring cylinder" is just one of a plurality of available measurement commands that can be selected by the user.

With respect to the selected measurement command 40, the user then establishes a plurality of setting parameters 42, in the present case a number of measurement points, a measurement speed and a measurement direction. In FIG. 3 the plurality of setting parameters 42 selected by the user relate directly to the cylinder 41 or to the concrete dimensioning thereof (d1 and h1). For each of the plurality of setting parameters 42, the user inputs a concrete parameter value 44 (the numerical value "4" in the case of the number of measurement points) via an input mask and confirms this entry/these entries preferably via an OK button The inputs effected by the user in the form of the plurality of setting parameters 42 with regard to the selected measurement command 40 are received and preferably stored (in step S100) by the evaluation and control unit 34.

FIG. 4 illustrates a second schematic illustration of a display view, in which, with respect to a second cylinder 45, which differs from the cylinder 41, the user selects the plurality of setting parameters 42 and in this case defines different parameter values 44 for each selected setting parameter, since the second cylinder 45 has larger dimensions (d2, h2) in comparison with the cylinder 41. In FIG. 4, too, e.g. clicking or double clicking on the second cylinder 45 serves as an input command with regard to the measurement command 40. The plurality of setting parameters 42 selected with respect to the measurement command 40 are once again received and preferably stored by the evaluation and control unit 34.

In accordance with FIGS. 3 and 4, therefore, with respect to the same measurement command 40 "Measuring cylinder", a plurality of setting parameters, in the present case at least partly differing in their parameter values, with regard to the cylinders 41, 45 were received (step S100), which are used in the method for steps S200 (evaluating) and S300 (determining).

The plurality of setting parameters 42 are then evaluated statistically and/or by machine-assisted learning in order to determine from the evaluated plurality of setting parameters 42 at least one setting parameter 48 as presetting 46 and to output it as a setting parameter proposal 50 to the user during renewed selection of the same measurement command 40 (step S400).

In the present case, the evaluation has the effect e.g. that e.g. metadata with respect to the individual setting parameters 42 (e.g. which setting parameter values were selected by the user with respect to which measurement object dimension d1, h1, d2, h2) are concomitantly included as well.

FIG. 5 shows the outputting of a setting parameter proposal 50 on the basis of the presetting determined from the plurality of setting parameters 42 (e.g. from FIGS. 3 and 4).

If the user selects e.g. a third cylinder 52 in the measurement plan, i.e. generates once again an input command for selecting the measurement command 40 "Measuring cylinder", the method outputs the setting parameter proposal 50 (e.g. acoustically, visually and/or tactilely). In this case, the method recognizes on the basis of the metadata included in the evaluation, for example, that the third cylinder 52 has a similar or identical diameter to the second cylinder 45 (query d=d2 ?), and outputs to the user the setting parameter proposal 50, in which the setting parameter (values) of the second cylinder 45 are proposed to the user for the third cylinder 52 as well. The user can e.g. accept this proposal by pressing an OK button or reject it by pressing a cancel button.

Figure 6:
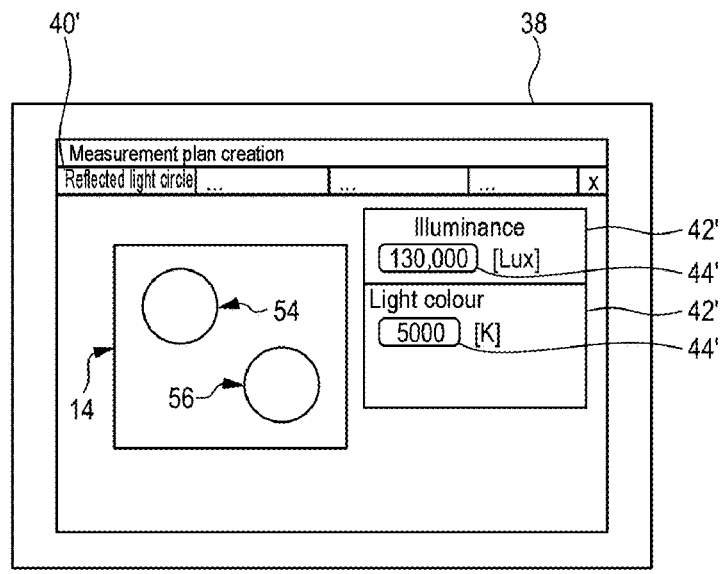
FIG. 6 shows a fourth schematic illustration for elucidating principles of the method.
Figure 7:
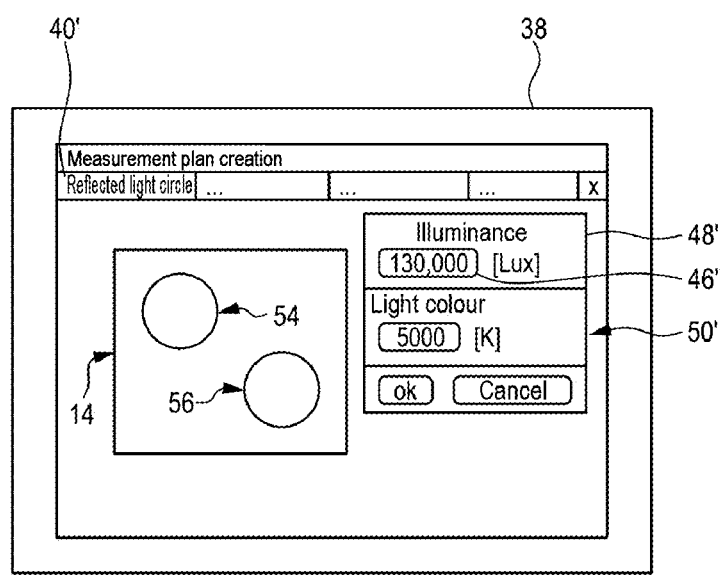
FIG. 7 shows a fifth schematic illustration for elucidating principles of the method.

FIGS. 6 and 7 illustrate two example display views that are presented to the user e.g. when inputting control commands.

In the case of FIG. 6, in a submenu "Reflected light circle", for example, the user repeatedly measures a reflected light circle 54 on the measurement object 14. In this case, a reflected light circle corresponds to a measurement element circle which is measured on the measurement object 14 and with so-called reflected light illumination (or Bright Field illumination), wherein the reflected light illumination improves the detectability of the measurement object 14 particularly for optical measuring apparatuses 100. With respect to each measured reflected light circle, the user preferably defines specific edge finding parameters.

Besides light intensity, brightness, light color and intensity, for example, the user can also define further edge finding parameters, such as the light focus, e.g. by a stop being opened or closed by software, which is effected by software by means of the definition of the reflected light circles 54 on the measurement object 14.

Measuring such a reflected light circle 54 will be understood as a control command 40'. With respect to the reflected light circle 54, the user can select a plurality of setting parameters 42' (e.g. illuminance, light color, etc.) and assign specific parameter values 44' thereto. These setting parameters 42' are received and evaluated for each measured reflected light circle 54 in order to determine from the evaluated setting parameters 42' a preferred presetting 46' with regard to a specific control command.

If the user then measures a further reflected light circle 56, as is discernible in FIG. 7, the method makes it possible for it to be recognized, for example, that the user would probably like to define further edge finding parameters with respect to the measured reflected light circle 54, wherein all these setting parameters can be provided to the user as a setting parameter proposal 50'.

In the example elucidated in FIGS. 6 and 7, the method was illustrated in a greatly simplified manner in order to facilitate comprehension and for the sake of better illustration. In other advantageous application examples of the method and respectively of the device 200, the input or control command may be e.g. not as a result of the (active) selection of the button "Reflected light circle". It is likewise possible for the method and the device already to recognize the measurement of an (arbitrary) circle by the user as a control command. The system, in particular by means of the machine-assisted learning, then recognizes on the basis of the context, for example, that the user would like to measure a "Reflected light circle", and automatically sets the edge finding parameters for "reflected light circle" set previously by the user, which are displayed to the user as the setting parameter proposal 50'. The herein presented method thus makes it possible already to deduce on the basis of the context what the user might intend in the next step, at least with a certain probability, in order to output to the user a setting parameter proposal which appropriately matches that.

Statements made above are also applicable in an analogous manner with regard to the example embodiment shown in FIGS. 3-6, such that not just the selection of the button "Measuring cylinder" can be recognized as a measurement command, rather e.g. the establishment of a cylinder in a different application environment also already functions as a measurement command allowing the system to recognize that the user would probably like to establish the cylinder as measurement element, and therefore already to output the setting parameter proposal 50 to the user for the next step, in which proposal at least one of the cylinder-related setting parameters is preset.

Likewise, already on the basis of the fact that the user repeatedly closes or hides a specific user interface (e.g. window and/or a specific menu bar), the system and respectively the method can also recognize that the user does not require the visibility of the user interface. As a setting parameter proposal, the system can then output automatic hiding of the user interface. The same also applies to repeated insertion of a user interface. Generally, therefore, all context-sensitive settings or actions effected by the user can be recognized as measurement or control commands or as a plurality of setting parameters and be evaluated.

It goes without saying that the examples mentioned above can be applied to use for arbitrary measurement or control commands and arbitrary setting parameters. It likewise goes without saying that the examples mentioned above were greatly simplified. In practice, the statistical evaluation and/or the evaluation by means of machine-assisted learning are/is effected not just on the basis of two previously received and stored inputs, but rather on the basis of a very large number of previously received and stored inputs. The greater the number of such inputs received and stored, the more valid the results yielded by the evaluation and the better the pre-settings can be determined for a specific measurement or control command.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for in-stance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase at least one of A, B, and C should be construed to mean a logical (A OR B OR C), using a non-exclusive logical OR, and should not be construed to mean "at least one of A, at least one of B, and at least one of C."

What is claimed is:

1. A method for creating a measurement plan of a dimensional measuring apparatus, the dimensional measuring apparatus having a measuring head configured to detect measurement points on a measurement element, the method comprising:
   receiving a plurality of setting parameters defining a measurement or control command of a plurality of measurement or control commands of the dimensional measuring apparatus, wherein the plurality of setting parameters includes at least one of (i) a number of measurement points to be moved on to the measurement element, (ii) a measurement direction, (iii) a measurement speed, and (iv) edge finding parameters;
   evaluating the plurality of setting parameters received based on at least one of a statistical evaluation and an evaluation using machine-assisted learning;
   determining a presetting that assigns at least one setting parameter of the evaluated plurality of setting parameters to the measurement or control command;
   outputting a setting parameter proposal to a user based on the determined presetting in response to receiving an input command from the user for selecting the measurement or control command;
   creating the measurement plan in response to the user accepting or rejecting the setting parameter proposal; and
   after creating the measurement plan, controlling the dimensional measuring apparatus using the measurement plan during a measurement operation.

2. The method of claim 1, wherein each of the plurality of setting parameters comprises at least one of parameter values and information defining the measurement or control command.

3. The method of claim 1, wherein the statistical evaluation comprises determining a frequency distribution in which a frequency value is assigned to each of the received plurality of setting parameters.

4. The method of claim 3, wherein determining the presetting comprises assigning the at least one setting parameter of the plurality of setting parameters to the measurement or control command depending on a frequency distribution.

5. The method of claim 1, wherein the evaluation using machine-assisted learning comprises determining a probability distribution in which a probability value is assigned to each of the received plurality of setting parameters.

6. The method of claim 5, wherein determining the presetting comprises assigning the at least one setting parameter of the plurality of setting parameters to the measurement or control command depending on the probability distribution.

7. The method of claim 5, wherein the probability values are determined using a predetermined training data set.

8. The method of claim 1, wherein the receiving, evaluating, determining, and outputting are performed iteratively, with each iteration beginning upon conclusion of a prior iteration.

9. The method of claim 1, wherein the receiving, evaluating, determining, and outputting are performed in response to a user activation of a predefined assistance mode.

10. The method of claim 1, further comprising:
receiving a further input command for selecting an unknown measurement or control command;
comparing the unknown measurement or control command with the plurality of measurement or control commands;
determining a similar measurement or control command from the plurality of measurement or control commands, which is similar to the unknown measurement or control command, based on the comparison; and
outputting the setting parameter proposal with respect to the similar measurement or control command.

11. The method of claim 1, further comprising:
receiving a further input command for selecting an unknown measurement or control command;
comparing the unknown measurement or control command with the plurality of measurement or control commands;
determining at least two similar measurement or control commands from the plurality of measurement or control commands, which are similar to the unknown measurement or control command, based on the comparison;
interpolating between pre-settings assigned to the at least two similar measurement or control commands; and
outputting an interpolated setting parameter proposal.

12. A non-transitory computer-readable medium comprising program code configured to carry out a method for creating a measurement plan of a dimensional measuring apparatus when the program code is executed by a computer system, the dimensional measuring apparatus having a measuring head configured to detect measurement points on a measurement element, the method comprising:
receiving a plurality of setting parameters defining a measurement or control command of a plurality of measurement or control commands of a dimensional measuring apparatus, wherein the plurality of setting parameters includes at least one of (i) a number of measurement points to be moved on to the measurement element, (ii) a measurement direction, (iii) a measurement speed, and (iv) edge finding parameters;
evaluating the plurality of setting parameters received based on at least one of a statistical evaluation and an evaluation using machine-assisted learning;
determining a presetting that assigns at least one setting parameter of the evaluated plurality of setting parameters to the measurement or control command;
outputting a setting parameter proposal to a user based on the determined presetting in response to receiving an input command from the user for selecting the measurement or control command;
creating the measurement plan in response to the user accepting or rejecting the setting parameter proposal; and
after creating the measurement plan, controlling the dimensional measuring apparatus using the measurement plan during a measurement operation.

13. A device for creating a measurement plan of a dimensional measuring apparatus or for controlling a measurement of the dimensional measuring apparatus, the dimensional measuring apparatus having a measuring head configured to detect measurement points on a measurement element, the device comprising:
a display; and
a control system, wherein the control system is connected to the display via a data connection and configured to:
receive a plurality of setting parameters defining a measurement or control command of a plurality of measurement or control commands of the dimensional measuring apparatus, wherein the plurality of setting parameters includes at least one of (i) a number of measurement points to be moved on to the measurement element, (ii) a measurement direction, (iii) a measurement speed, and (iv) edge finding parameters;
evaluate the plurality of setting parameters received based on at least one of a statistical evaluation and an evaluation using machine-assisted learning;
determine a presetting that assigns at least one setting parameter of the evaluated plurality of setting parameters to the measurement or control command;
output a setting parameter proposal to a user based on the determined presetting in response to receiving an input command from the user for selecting the measurement or control command;
create the measurement plan in response to the user accepting or rejecting the setting parameter proposal; and
after the measurement plan is created, control the dimensional measuring apparatus using the measurement plan during a measurement operation.

14. The device of claim 13, further comprising the dimensional measuring apparatus.

15. The device of claim 13, wherein each of the plurality of setting parameters comprises at least one of parameter values and information defining the measurement or control command.

16. The device of claim 13, wherein the control system is configured to determine the statistical evaluation by determining a frequency distribution in which a frequency value is assigned to each of the received plurality of setting parameters.

17. The device of claim 16, wherein the control system is configured to determine the presetting by assigning the at least one setting parameter of the plurality of setting parameters to the measurement or control command depending on a frequency distribution.

18. The device of claim 13, wherein the control system is configured to perform the evaluation using machine-assisted learning by determining a probability distribution in which a probability value is assigned to each of the received plurality of setting parameters.

19. The device of claim 18, wherein the control system is configured to determine the presetting by assigning the at least one setting parameter of the plurality of setting parameters to the measurement or control command depending on the probability distribution.

20. The device of claim 18, wherein the control system is configured to determine the probability values using a predetermined training data set.

\* \* \* \* \*